United States Patent [19]

Smarook

[11] 3,765,928

[45] Oct. 16, 1973

[54] ETHYLENE/ALPHA, BETA-UNSATURATED ACID INTERPOLYMERS AS ADHESIVE SYSTEMS FOR POLYURETHANES

[75] Inventor: Walter Henry Smarook, Sommerville, N.J.

[73] Assignee: Union Carbide Corporation, New York, N.Y.

[22] Filed: Mar. 31, 1971

[21] Appl. No.: 129,942

Related U.S. Application Data

[63] Continuation-in-part of Ser. No. 809,428, March 21, 1969, abandoned.

[52] U.S. Cl. .......... 117/72, 117/132 C, 117/161 KP, 156/79, 156/334, 161/160, 161/190, 204/181
[51] Int. Cl. ............................................. B44d 1/09
[58] Field of Search .......................... 156/79, 334; 161/160, 190; 264/45, 47; 117/161 KP, 132 C, 72; 204/181

[56] References Cited
UNITED STATES PATENTS

| | | |
|---|---|---|
| 3,173,826 | 3/1965 | Campbell et al..................... 156/79 |
| 3,325,431 | 6/1967 | McManus............................. 161/160 |
| 3,445,362 | 5/1969 | Chow et al........................... 204/181 |
| 3,467,569 | 9/1969 | Weber et al. ........................ 161/160 |
| 3,475,267 | 10/1969 | Miles .................................. 161/203 |
| 3,496,058 | 2/1970 | Schroter et al. ..................... 156/79 |

*Primary Examiner*—William J. Van Balen
*Attorney*—James C. Aruontes et al. and Aldo John Cozzi

[57] ABSTRACT

Laminates are prepared by bonding a layer or coating of ethylene/alpha,beta-olefinically unsaturated acid interpolymer to a substrate, and thereafter reacting a foamable mixture comprising polyisocyanate and polyol to produce cellular polyurethane such that at least a portion of said polyurethane becomes bonded to said substrate through said interpolymer during the foaming reaction.

8 Claims, No Drawings

ETHYLENE/ALPHA, BETA-UNSATURATED ACID INTERPOLYMERS AS ADHESIVE SYSTEMS FOR POLYURETHANES

This application is a continuation-in-part of abandoned application Ser. No. 809,428 entitled "Ethylene Polymers As Urethane Tie Coats" by W. H. Smarook, filed Mar. 21, 1969, said continuation-in-part application being assigned to the same assignee as the instant application.

This invention relates to the preparation of laminates which comprise coating or layering an ethylene/alpha, beta-olefinically unsaturated carboxylic acid interpolymer to a substrate, and thereafter reacting a foamable mixture comprising polyisocyanate and polyol to produce cellular polyurethane such that at least a portion of said polyurethane becomes bonded to said substrate through said interpolymer during the foaming reaction. Such laminates are useful as thermal barriers, as packaging material, as a structural material for forming containers, and the like.

By the practice of the invention cellular polyurethane, either rigid or flexible, is formed in situ in contact with a substrate which has been previously coated or "layered" with the aforesaid interpolymer. Such in situ formation of the polyurethane foam in an enclosed or partially enclosed area is especially advantageous since both the heat of reaction and the expansive force of the resulting foam against the coated substrate tend to promote the adhesion of said foam to said substrate through the ethylene/unsaturated acid interpolymer coating or layer.

The ethylene/alpha-beta olefinically unsaturated acid interpolymer can be applied to the substrate by any method known to those skilled in the art. For instance, a solution of interpolymer can be applied to the substrate followed by evaporation of the solvent thus leaving a thin homogeneous coating of the interpolymer on the substrate. Other methods include dip coating, spraying, brushing, melt coating, and other techniques well-known to the art.

Where the solvent method is employed, the interpolymer is dissolved in an inert organic solvent, followed by applying the resulting solution to the substrate, and then evaporating the solvent therefrom. Applicable solvents include the aliphatic and aromatic hydrocarbons and their halogenated derivatives in which the interpolymer is soluble at elevated temperatures. As examples of such solvents, one can mention hexane, heptane, octane, methylcyclohexane, cyclohexane, decalin, benzene, toluene, xylene, tetralin, cyclohexanone, tetrachloroethylene, petroleum ether, solvent naphtha, turpentine, and the like.

The ethylene/alpha,beta-olefinically unsaturated acid interpolymers which are contemplated as the adhesive system can be prepared by processes well-documented in the art and explained hereinafter. These processes involve the polymerization of an admixture comprising (i) ethylene and (ii) an alpha,beta-olefinically unsaturated acid such as the straight-chain and cyclic polymerizable monocarboxylic and dicarboxylic unsaturated acids which have from three to 15 carbon atoms, e.g., acrylic acid, methacrylic acid, crotonic acid, itaconic acid, citraconic acid, maleic acid, fumaric acid, and mixtures thereof. Especially suitable acids are acrylic acid, methacrylic acid, and mixtures thereof. Acrylic acid is preferred.

The interpolymer can contain chemically combined therein (i) from about 1.5 to about 50 weight percent alpha,beta-olefinically unsaturated acid, and (ii) from about 45 to about 98.5 weight percent ethylene, preferably from about 60 to 82 weight percent ethylene. If desired, other polymerizable monomers in amounts up to about 35 weight percent can be employed in the preparation of the interpolymers. For sake of convenience such polymerizable monomers will hereinafter be referred to as "optional comonomers."

Illustrative "optional comonomers" include the $C_1$–$C_{12}$ alkanol esters of acrylic acid, of methacrylic acid, of itaconic acid, of citraconic acid, of crotonic acid, of maleic acid, and of fumaric acid; vinyl formate; vinyl acetate; vinyl propionate; vinyl butyrate; vinyl chloride; vinylidene chloride; acrylamide; N-vinylacrylamide; N-methylacrylamide; N-vinylacetamide; N-methyl-N-vinylacetamide; and the like. The interpolymers can also contain the recurring

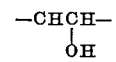

group in their structure.

The interpolymers may be block, random, or graft polymers, or mixtures thereof.

As indicated previously, the ethylene/unsaturated acid interpolymers can be prepared by various processes documented in the art. One such process involves the use of free-radical catalysts in which ethylene, an alpha,beta-olefinically unsaturated carboxylic acid, and optional comonomer, if any, are added separately, or as a mixture to a pressure reactor, provided that they are in intimate contact with the free-radical catalyst at the polymerization conditions, i.e., superatmospheric pressures and elevated temperatures such as 15,000 to 50,000 psig and 70° to about 225°C. The process can be carried out with or without diluents which may or may not be solvents for either of the monomers or for the resulting interpolymer. After completion of the polymerization reaction, the interpolymer is recovered by methods known in the art.

The term "free-radical catalyst" is intended to mean a catalyst which forms free radicals under the polymerization conditions employed, and include peroxides such as hydrogen peroxide, dibenzoyl peroxide, diacetyl peroxide, di-tert-butyl peroxide, dilauroyl peroxide, perbenzoic acid, peracetic acid, and the like; azo compounds such as azobisisobutyronitrile, and the like; etc.

The ethylne/alpha,beta-olefinically unsaturated acid interpolymers can also be prepared by a continuous emulsion polymerization process which involves continuously charging to a reactor, operated at high temperature and pressure, the polymerizable monomers, water, a persulfate catalyst, and one or more surfactants, and continuously recovering the latex produced. The exact manner in which the several components are charged to the reactor, or the particular type of reactor utilized, are not critical. A convenient procedure is to charge the water, surfactant, and catalyst in one stream, the ethylene as a second stream, and the alpha,beta-olefinically unsaturated acid and optional comonomer, if any, as a third stream, to the ractor under agitation to insure thorough mixing.

Polymerization temperatures may range from about 100°C. to about 160°C., and more preferably are in the range of about 110°C. to about 150°C. While it is ordinarily desirable to utilize the highest temperature possible, within the above range, so as to maximize heat transfer and optimize the physical properties of the interpolymer, the optimum temperature for the process is dependent upon the particular catalyst and surfactant employed and upon the composition of the particular interpolymer being produced. Thus, for example, with an ethylene/acrylic acid/vinyl acetate interpolymer, it is usually desirable to keep the temperature in the range of about 110°C. to about 120°C. to avoid excessive crosslinking or branching which results in the formation of an interpolymer which lacks strength.

The polymerization is conducted at a pressure of about 5,000 psig. and preferably at least about 10,000 psig. The main effect of an increase in pressure is to increase the reaction rate. Since there are no significant detrimental effects occuring with the use of high pressure the polymerization reaction is ordinarily conducted at the highest pressure which is practical as dictated by the requirements of safety and economics. Thus, pressures in the range of from about 5,000 psig. to about 50,000 psig., or more, may be used. A balance between competing considerations will ordinarily indicate the use of a pressure in the range of about 10,000 to about 30,000 psig.

Ethylene, alpha,beta-olefinically unsaturated acid, and optional comonomer, if any, are charged to the reactor in proportions depending upon the composition of the interpolymer desired. As employed herein and in the appended claims, the term "total monomer" is used to refer to the total charge to the reactor of ethylene, alpha,beta-olefinically unsaturated acid, and optional comonomer. Thus, the total monomer may consist of, for example, ethylene and acrylic acid; or ethylene and methacrylic acid; or ethylene, ethyl acrylate, and acrylic acid; or ethylene, vinyl acetate, and acrylic acid; or ethylene, methyl methacrylate and methacrylic acid; or ethylene, acrylic acid, ethyl acrylate; and so forth. To produce the interpolymers, the total monomer charge to the reactor will consist of at least 50 mol percent ethylene and from about 0.2 to about 15 mole percent of an alpha,beta-olefinically unsaturated acid with any remaining balance being the optional comonomer. Thus, the total monomer might, for example, consist of 99 percent ethylene and 1 percent acrylic acid; or 90 per cent ethylene and 10 percent methacrylic acid; or 85 percent ethylene and 15 percent acrylic acid; or 70 percent ethylene, 15 percent acrylic acid, and 15 percent ethyl acrylate; or 60 percent acrylic acid and 30 percent vinyl acetate; or 60 percent ethylne, 5 percent acrylic acid, 20 percent ethyl acrylate, and 15 percent methyl methacrylate; and so forth (all illustrative compositions given being in mole percent).

The rate of at which total monomer is charged to the reactor is at least about 50 pounds per hour per cubic foot of reactor volume, and preferably a rate in the range of about 100 to about 300 pounds per hour per cubic foot of reactor volume. This is the total rate of the combined charge of all of the monomers, i.e., ethylene plus alpha,beta-olefinically unsaturated acid plus optional comonomer, if any. The maximum rate at which total monomer can be fed is limited primarily by the necessity of dissipating the large amount of heat generated by the polymerization reaction and is thus, in part, determined by reactor design. Operation at a rate below the minimum specified is uneconomical and frequently undesirable from the viewpoint of the physical properties of the resulting latex.

Water is charged to the reactor in an amount dependent upon the rate of charge of total monomer and upon the desired solids content of the interpolymer latex. Latexes having the desired combination of prorties described herein can be produced by charging the reactor with water at a rate of from about 0.3 to about 3 pounds per pound of total monomer undergoing conversion to interpolymer and preferably from about 0.8 to about 1.5 pounds per pound of total monomer undergoing conversion to interpolymer.

As indicated hereinbefore, the continuous emulsion polymerization process utilizes a persulfate compound as catalyst. More specifically, the catalyst may be ammonium persulfate; the alkali metal persulfates, e.g., sodium persulfate, potassium persulfate; and the like. The preferred catalyst is potassium persulfate.

The amount of catalyst employed is not critical as long as it is present in sufficient concentration to promote the polymerization, i.e., a catalytically effective amount. An amount of at least about 0.001 pounds per pound of total monomer undergoing conversion to interpolymer is ordinarily required. Generally speaking, amounts of from about 0.001 to about 0.02 pounds per pound of total monomer undergoing conversion to polymer are employed, with preferred amounts being in the range of about 0.002 to about 0.007 pounds per pound of total monomer.

The use of a surfactant is an essential feature of the continuous emulsion polymerization process. The surfactant serves a dual function in that it assists in the initiation of new polymr particles and also helps to stabilize the latex. However, from the standpoint of the end use of the latex, the use of a surfactant in the process can be detrimental since it may end up as a contaminant and may adversely affect the properties of the interpolymer. Accordingly, it is desirable that the concentration of surfactant be held to a minimum.

The surfactant should be chemically stable and capable of forming abundant micelles under the operative conditions of the process. As is well known in the polymer art, the formation of micells, i.e., small clusters of surfactant molecules, is necessary to the formation and growth of the interpolymer particles composing a latex. The concentration of surfactant at which micelles begin to form in detectable quantities is called the critical micelle concentration and is dependent upon the structure of the surfactant and upon the temperature.

A single surfactant or mixture of two or more surfactants may be employed. Anionic surfactants are particularly effective, especially those that have a low critical micelle concentration at room temperature, e.g., 0.1 weight percent or less. A combination of an anionic surfactant and a nonionic surfactant may be employed, and such combination has been found to be particularly effective in promoting latex stability in the presence of multivalent metal ions such as calcium, magnesium or aluminum. Illustrative anionic surfactants include the amine or alkali metal salts of alkylaryl sulfonates such as sodium dodecylbenzenesulfonate, the isopropylamine salt of dodecylbenzenesulfonic acid, and the like; and the bis(alkyl)sulfosuccinates such as sodium bis(octyl)sulfosuccinate, sodium bis(tridecyl)sulfosuccinate, and the like.

The amount of surfactant must be sufficient to effect to dual functions of assisting in the initiation of new interpolymer particles and in aiding the stabilization of the latex which is formed. However, consistant with these requirements, it is ordinarily desirable to employ the smallest amount of surfactant possible and thereby minimize the detrimental effects of the surfactant on polymer properties. Amounts of surfactant in the range of about 0.005 to about 0.05 pounds per pound of total monomer undergoing conversion to polymer are operable, while preferred amounts are in the range of about 0.01 to about 0.03 pound per pound of total monomer undergoing conversion to polymer.

Since the interpolymer latexes always contain pendant carboxyl groups, the pH in the reactor must be maintained at a low level to avoid inhibition of the polymerization reaction. Ordinarily the pH will be maintained at a level of below about 4, and preferably below about 3. After the latex leaves the reactor, it is generally desirable to increase the pH to 7, or higher, by, for example, the addition of ammonium hydroxide, potassium hydroxide or sodium hydroxide, in order to minimize corrosion problems and to help stabilize the latex in storage.

The continuous emulsion polymerization is conducted at the highest conversion compatible with production of a high quality product. In terms of ethylene, the conversion is typically in the range of about 40 to about 90 percent, i.e., about 40 to about 90 percent of the ethylene charged to the reactor is converted to interpolymer. More frequently, the conversion of ethylene will be in the range of 60 to 80 percent. Since the alpha,beta-olefinically unsaturated acid component generally polymerizes much more rapidly than ethylene under the same conditions, the conversion of said acid will ordinarily be substantially complete, e.g., 98 percent or more. The optional comonomer, if any, will generally also polymerize more rapidly than ethylene so the degree of conversion of such comonomer will usually exceed that of the ethylene.

The flow rates of the several components charged to the reactor, as set forth hereinabove, are such that the residence time in the reactor is relatively brief. Actual residence time is, of course, not a single value but rather a wide distribution of actual residence time. The nominal residence time may be calculated from the feed rates and the reactor volume. Under the operating conditions described herein, the nominal residence time, i.e., the value obtained by dividing the reactor volume in ft.$^3$ by the total volumetric feed rate in ft.$^3$/hr., is ordinarily below about 0.5 hours and ranges downward to as low as about 0.1 hour, or less.

Process conditions may be selected within the limits specified hereinabove to provide a space productivity of at least about 25 lbs. of interpolymer per hour per cubic foot of reactor volume. Typically, a space productivity in excess of 50 and up to as high as 200 lbs. of interpolymer per hour per cubic foot of reactor volume, or even higher, can be achieved by optimization of process conditions.

The size of the polymer particles in the interpolymer latexes is in the range recognized by the art as characterizing a latex, i.e., below one micron, and ordinarily there is a broad particle size distribution. In such interpolymer latexes substantially all of the interpolymer particles are in the size range of from about 0.01 to about 1 micron, especially from about 0.01 to about 0.7. The average particle size distribution preferably is in the range of about 0.2 to about 0.5 microns. Melt index may vary from less than 0.1 to about 300, especially from less than 0.1 to about 200. The density of the interpolymer latex is preferably from about 0.945 to about 0.975. Based on density, crystallinity can vary from about 10 to about 70 percent. Filming temperature varies between about 70°C. to about 100°C.

The total solids content of the latexes described herein will usually exceed about 40 percent and solids contents of well above this value, e.g., in the range of 50 to 60 percent and, in some instances, even higher can be achieved by control of the process variables. These latexes have a far lower surfactant content than latexes produced by the teachings of the prior art in which a high content of surfactant is essential to provide adequate stability. These latexes will typically have a total surfactant content of less that 5 weight percent, based on total weight of solids in the latex, whereas the latex products known in the art have typically exhibited a total surfactant content of as high as 10 to 15 weight percent, or more, on the same basis.

The interpolymers contain, as essential components, both ethylene and an alpha,beta-olefinically unsaturated acid as hereinbefore described. The unsaturated acid promotes latex stability and improves interpolymer properties. The optional comonomer, if any, usually results in a decrease in the crystallinity of the interpolymer. Accordingly, the total monomers are added in an amount so that from about 10 to about 70 percent crystallinity is maintained in the latex of interpolymers.

The interpolymers exhibit physical properties extending over a broad spectrum depending upon both their composition and the process conditions employed in their production. The interpolymers of low alpha, beta-olefinically unsaturated acid content, e.g., copolymers composed of ethylene and up to 10 percent by weight of acrylic acid, are tough and strong and will form a film substantially equivalent in performance to extruded film from bulk polymerized polyethylene. They exhibit far higher ultimate tensile strength and ultimate elongation than interpolymers available in latex form heretofore and they are particularly distinguished from the prior art in this respect since stable interpolymer latexes heretofore produced directly by emulsion polymerization routes have invariably been composed of polymers which were weak and brittle.

Random interpolymers in which the total monomers are uniformly and randomly distributed along the interpolymer chain can be prepared as follows. The desired polymerization conditions are generally obtained by continuously feeding ethylene, the alpha-beta olefinically unsaturated acid, e.g., acrylic acid, the optional comonomer, if any, and a peroxide catalyst to a polymerization zone and continuously withdrawing interpolymer from the polymerization zone while maintaining substantially constant conditions of temperature, pressure, and monomeric feed concentration in said polymerization zone.

The polymerization reaction is conducted at a temperature of about 170°. to about 250°C. with temperatures in the range of 190°C. to 230°C. being preferred. The reaction pressure can vary from about 12,000 to about 30,000 psi. with pressures of from 15,000 to 27,000 psi being preferred. The average contact time at these conditions can vary from about 0.5 to about 5 minutes, preferably from 1 to 4 minutes.

The operative conditions in the polymerization zone should be substantially constant to obtain random interpolymers of ethylene and acrylic acid. Thus, the temperature throughout the reaction zone should be maintained within 10°C. and preferably within 5°C., of the average reaction temperature. This average temperature is maintained at the preselected value by slight adjustments in pressure, with temperature increasing with increasing pressure. Although this can be effected by any means known to the art, it has been found that the pressure should also be relatively constant and should not vary by more than 500 psi. from the selected value. Accordingly, it is preferred that the pressure be controlled by the use of a throttle valve in the polymer outlet from the reactor. The use of this type of valve permits the frequent small adjustments necessary to the maintenance of uniform temperature and pressure.

Uniformity of temperature and composition of the reaction mixture throughout the reaction is readily maintained by the use of a high degree of agitation coupled with the use of multiple points of feed to the reaction zone.

The total monomers, catalyst, and, if desired, a diluent or solvent, can be mixed prior to being fed to the reactor or can be fed separately, provided all feed rates are substantially constant. It has been found that the temperature of the feed components is important to the maintenance and control of uniform polymerization conditions, and should be in the range of from about 10°C. to about 150°C., preferably from 30°C. to 70°C., below the reaction temperature. When this condition is observed the exothermic heat of reaction is consumed by heating up the feed. Moreover, the degree of conversion can be controlled by controlling feed temperature, with conversion increasing as the difference between the feed and reaction temperatures increases. This results from the fact that, when more heat is required to raise the feed to the reaction temperature, the rate of polymerization will increase to supply the heat. In the situation where the various components are fed separately to the reactor, the "feed temperature" is the temperature of a mixing resulting from mixing the components at their respective feed temperatures, disregarding the temperature of mixing.

The amount of alpha-beta olefinicially unsaturated acid, e.g., acrylic acid, fed to the reaction can vary from 0.1 to 5 mole percent, based on ethylene feed, with amounts of from 0.25 to 4.0 mole percent preferred.

The catalysts which are employed in this random polymerization process are peroxide catalysts which form free radicals under the reaction conditions such as di-tert-butyl peroxide, di-alpha-cumyl peroxide, dibenzoyl peroxide and the like. Oxygen is not employed. Although azo-type catalysts theoretically can be employed, they are generally too unstable at the reaction temperatures to be of practical use. The amount of catalyst employed can vary from 0.5 to 500 ppm, based on ethylene, with from 5 to 50 ppm preferred.

Inert diluents or solvents such as isooctane, benzene, and the like can be present in amounts of up to about 50 weight percent or more, if desired. Although not necessary, it is preferred to charge the catalyst to the reaction zone in a solution of the solvent to permit accurate control of catalyst concentration. The random interpolymer product is recovered from the reaction by methods known to those skilled in the art.

The degree of uniformity of the ethylene/acrylic acid interpolymer can be determined by infrared analysis. The spectra from the random interpolymers are characterized by the substantial absence of absorp-tion bands at $7.9\mu$, $8.9\mu$, $9.1\mu$, $10.1\mu$, and $12.6\mu$. These bands are present in the non-uniform interpolymers produced by the continuous emulsion polymerization processes of the prior art. In addition, the uniform random interpolymers have glass transition temperatures in the range of from 20° to 27°C. whereas the non-uniform interpolymers produced by batch methods have glass transition temperatures of about 40°C. Those interpolymers produced in the continuous tubular reactor have glass transition temperatures of about 70°C.

The "glass transition temperature," as employed herein, is defined as that temperature at which the curve obtained from a plot of mechanical loss against temperature is a maximum.

The interpolymers produced in the manner described above are termed "random interpolymers." By the term "random interpolymer" as employed herein, is meant an interpolymer each of whose macromolecules contains substantially the same proportions of polymerized comonomers and such comonomers are randomly distributed along the interpolymer chain rather than grouped in blocks of substantially one monomer.

The interpolymers, especially the aforementioned "random interpolymers," may be admixed with water and a water-soluble base to obtain clear, colloidal dispersion. Films are readily cast from such dispersions and, after a moderate fusion step, such as heating at 350°C. for about 5 minutes, are continuous and free from impurities and have ex-cellent adhesion to a variety of substrates. The polyurethane may then be applied as described herein to films obtained in such a manner.

These dispersions comprise water, up to about 50 weight percent of ethylene/acrylic acid interpolymer (based on the total weight of the dispersion), and a water-soluble base. Th water-soluble bases which are employed in producing such dispersions are the alkali metal hydroxides, i.e., lithium hydroxide, sodium hydroxide, potassium hydroxide, rubidium hydroxide, and cesium hydroxide. Ammonium hydroxide is also suitable and is intended to be included by the term "alkali metal hydroxide."

The amount of alkali metal hydroxide sufficient to colloidally disperse the ethylene/acrylic acid interpolymer can vary from about 30 to 100 mole percent of the polymerized alpha,beta-olefinically unsaturated carboxylic acid in the interpolymer, with amounts of from 40 to 60 mole percent being preferred. The resulting dispersion has a pH greater than 7, and it is generally in the range of from 7.2 to 10.5. In general, as the amount of water-soluble base increases, the particle size distribution of the ethylene/acrylic acid interpolymer in the dispersion decreases. Such particle size distribution will vary within the range of from about 0.02 to about 20 microns.

Graft and block interpolymers can be manufactured according to the method of Rugg and Potts as described in U.S. Pat. Nos. 3,027,346 and 2,970,129. Block interpolymers are made by non-continuous batch processes described in the art in which monomers of different reaction rates such as the ethylene and an alpha-beta olefinically unsaturated acid, e.g., acrylic acid, and in some instances the optional comonomer, are simultaneously charged to a batch reactor and allowed to polymerize under operative conditions and with catalysts well known in the art.

In one embodiment of the invention salts of the interpolymer are employed in the novel method. Such salts are obtained by reacting the pendant carboxyl groups of the interpolymers with an alkaline compound or with polyvalent metal-containing compounds such as the hydroxides of the Group IIA metals, e.g., beryllium, magnesium, calcium, strontium, and barium; the hydroxides of the Group IA metals, specifically lithium, sodium, potassium, rubidium, and cesium; nitrogenous compounds such as ammonia, amines, and ammonium hydroxides.

The preferred nitrogenous compounds used to form the interpolymer salts may be represented by the formula:

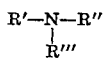

wherein each of R', R'', and R''' is hydrogen or an organic radical containing up to 10 carbon atoms and which can be unsubstituted or substituted with a hydrophilic group such as hydroxyl, amino, imino, or cyclic ether and wherein two of the organic radicals when taken together form a heterocyclic compound. The organic radical can be a hydrocarbon radical containing up to 10 carbon atoms such as an alkyl, cycloalkyl, aryl, alkaryl, or aralkyl. Suitable alkyls include methyl, ethyl, and isopropyl. Representative cycloalkyls include cyclobutyl, cyclopentyl, and cyclohexyl. Representative aryls include phenyl and naphthyl. Among the alkaryl and aralkyl radicals which can be used are benzyl, cumyl, tolyl, and xylyl. Representative compounds include ethanolamine, diethanolamine, triethanolamine, ethylenediamine, diethylenetriamine, triethylenetetramine, dimethylamine propylamine, diethylaminepropylamine, N-(hydroxyethyl)ethylenediamine, N-(2-hydroxypropyl)ethylenediamine, piperazine, 2,5-dimethylpiperazine, piperidine, morpholine, and the like.

These interpolymer salts can be prepared by neutralizing the ethylene/alpha,beta-olefinically unsaturated acid interpolymers (which are characterized by pendant carboxyl groups) with the aforedescribed alkaline compounds. Preferred alkaline compounds are the quaternary ammonium hydroxides, e.g., trimethylammonium hydroxide; ammonium hydroxide; lithium hydroxide; sodium hydroxide; and potassium hydroxide. Any method known in the art can be used to effect this neutralization process.

Where thin coatings of less than 5 microns of electrodeposited interpolymers are desired, it is preferred to use the interpolymer salts which are characterized by inorganic monovalent cations such as $Na^+$, $K^+$, $Li^+$ or $NH_4^+$ cations. Where thicker coatings of electrodeposited polymers are desired, and that is, from 5 to 30 microns, it is preferred to use e interpolymer salts which are characterized by organic monovalent cations such as organic amines which contain one or more hydrophilic groups. Particularly preferred cations of this group are those derived from piperazine, morpholine, ethylenediamine, and the mono-, di-, and triethanolamines.

When ammonium hydroxide is used as the alkaline compound it may be removed or substantially removed or partially removed from a coated substrate by volatilization at elevated temperatures, thus converting the interpolymer salt back to its original interpolymeric composition in whole or in part. "Non-fugitive" salts of the interpolymers may be back hydrolyzed in whole or in part to achieve the same results. Electrolytic deposition of a solution of interpolymer salts onto an anodic surface will also remove cationic species from the interpolymer salts, especially if cathode and anode are separated by a membrane as disclosed in U.S. Pat. No. 3,445,362, issued May 20, 1969.

The interpolymer salts may also be made according to methods well known in the art such as those described in U.S. Pat. Nos. 3,249,570; 3,267,083; 3,264,272; 3,000,840 and 2,566,244.

Maximum adhesion of the "non-fugitive" salts of the ethylene/alpha,beta-olefinically unsaturated carboxylic acid interpolymer is generally obtained by neutralizing from 0 to about 45 per cent, especially 0 to about 20 per cent, and preferably 0 to about 10 per cent of the pendent carboxyl moieties (of said interpolymer) with an alkaline compound. The group IIA alkaline earth metal compounds are employed in amounts to obtain from 0 to about 25 per cent, especially 0 to about 15 per cent, and preferably 0 to about 10 per cent neutralization of the pendant carboxyl moieties. The salts based on polyvalent metal compounds noted in the above patents other than the Group IIA metals may be employed in amounts to tobain 0 to about 12 per cent, especially 0 to about 8 per cent, and preferably 0 to about 4 per cent neutralization of the pendant carboxyl moieties.

The "non-fugitive" salts by definition are those salts that are not removed or are substantially unremoved at ambient pressure conditions when the salt of the interpolymer is heated from about 10°C. to about 150°C. for about 48 hours to about 6 minutes, especially from about 15°C. to about 125°C. for about 4 hours to about 10 minutes, and preferably from about 40°C. to about 90°C. for about 45 minutes to about 15 minutes. It should be noted that the "fugitive" nature of the such salts is a time-temperature relationship. The Group IA or Group IIA metal salts such as the sodium salts or the calcium salts, by way of example, would be classified as "non-fugitive." Ammonium salts tend to volatilize at ambient temperature and pressure conditions or at higher temperatures and consequently, are considered to be "fugitive."

In another embodiment of the invention, it has also been discovered that either vinyl acetate, the acrylic esters of $C_1$—$C_4$ aliphatic alcohols, e.g., methanol and ethanol, or N-methyl-N-vinylacetamide, may be substituted for the alpha-beta olefinically unsaturated acid to prepare the interpolymers. These interpolymers may be made in the same manner as the ethylene/acrylic acid random interpolymers previously described.

The cellular polyurethane is prepared by reacting a foamable mixture comprising polyisocyanate, polyol, and other ingredients, against or in contact with the coated or "layered" substrate. The polyisocyanates which are contemplated can be represented by the formula $R(NCO)_x$ wherein $x$ is an integer of 2 or more, preferably 2 or 3; and R is any polyvalent organic radical having a valence of $x$ and in which the valence bonds are from carbon atoms. Thus, suitable organic polyisocyanates are monomeric polyisocyanates or polymeric polyisocyanates. In general, R can be a hydrocarbon moiety such as an aliphatic and/or alicyclic moiety, and it contains at least 2, preferably from 2 to about 40 carbon atoms.

As examples of suitable polyisocyanates one can mention 1,2-diisocyanatoethane, 1,2-diisocyanatopropane, 1,4-diisocyanatobutane, 1,6-diisocyanatohexane, bis(3-isocyanatopropyl)ether; bis-(3-isocyanatopropyl)-sulfide, the bis(3-isocyanatropropyl) ether of 1,4-butylene glycol, 1,4-diisocyanatobenzene, 2,4-diisocyanatotoluene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 1,3-diisocyanatocyclohexane, 1,4-diisocyanatocyclohexane, 1,4-diisocyanatonaphthalene, 1,5-diisocyanatonaphthalene, 2,4-diisocyanato-1-methylcyclohexane, bis(4-isocyanatocyclohexyl)methane, 1,1-bis(4-isocyanatocyclohexyl)-ethane, 2,2-bis(4-isocyanatocyclohexyl)propane, 1-isocyanatomethyl-4-isocyanatobenzene, 4,4'-diisocyanatoazobenzene, 2,4-diisocyanatodiphenyl ether, bis(4-isocyanatophenyl) ether, 2,2'-diisocyanatobiphenyl, 4,4-diisocyanatobiphenyl, 3,3'-dimethoxy-4,4'-diisocyanatobiphenyl, 3,3'-dimethyl-4,4'-diisocyanatobiphenyl, 3,3'-dimethyl-4,4'-diisocyanatobiphenyl, bis(4-isocyanatophenyl)methane, 2,2-bis(4-isocyanatophenyl)propane, bis(3-methoxy-4-isocyanatophenyl)methane, bis(4-methoxy-3-isocyanatophenyl)methane, 2,2-bis(3-chloro-4-isocyanatophenyl)propane. Preferred organic polyisocyanates are the diisocyanates, particularly the aromatic diiso-cyanates wherein the —N=C=O groups are on different ring carbon atoms of the same or different aromatic ring, e.g., 2,4-diisocyanatotoluene and dianisidine diisocyanate (3-methoxy-4-isocyanatobiphenyl).

Illustrative polyols which can be employed in the preparation of the cellular polyurethanes include the polyoxyalkylene polyols such as the ethylene oxide, 1,2-epoxypropane, and the vicinal epoxybutane adducts ethylene glycol, of propylene glycol, of 1,3-dihydroxybutane, of 1,4-dihydroxybutane, of 2-methyl-2-ethyl-1,3-propanediol, of 1,5-dihydroxypentane, of 2-ethylhexanediol-1,3, of glycerol, of 1,2,4-trihydroxybutane, of 1,2,6-trihydroxyhexane, of 1,1,1-trimethylolethane, of 1,1,1-trimethylolpropane, and the like.

The aforesaid illustrated polyols can be admixed with other polyols, preferably in minor amounts, i.e., less than 50 weight per cent, such as for example, the polyhydroxyalkanes, the trialkanolamines, and the alkylene oxide adducts thereof; the alkylene oxide adducts of mono- and polyamines; the alkylene oxide adducts of non-reducing sugars and non-reducing sugar derivatives; the alkylene oxide adducts of polyphenols; and the like.

Specific examples of additional polyols include, among others, ethylene glycol, propylene glycol, glycerol 1,2,6-trihydroxyhexane, pentaerythritol, sorbitol, triethanolamine, triisopropanolamine, the tributanolamines, and the alkylene oxide adducts of trialkanolamines wherein the oxyalkylene moieties thereof have from two to four carbon atoms, and the like. Other polyols include the alkylene oxide adducts of various amines such as methylamine, propylamine, benzylamine, aniline, the toluidines, ethylenediamine, diethylenetriamine, 1,3-butanediamine, 1,6-hexanediamine, the phenylenediamines, the toluenediamines, the naphthalenediamines, and others, wherein preferably the oxyalkylene moieties thereof have from two to four carbon atoms. Further polyols include the ethylene oxide, propylene oxide, and butylene oxide adducts of polyphenols such as 2,2-bis(4-hydroxyphenyl)propane, bis(4-hydroxyphenyl)propane, bis(4-hydroxyphenyl)methane, phenolformaldehyde condensation products, specifically the novolac resins, condensation products of various phenols and acrolein such as the 1,1,3-tris(hydroxyphenyl)-propanes, and the like. Other polyols include the ethylene oxide, propylene oxide, and butylene oxide adducts of non-reducing sugars such as sucrose, and of non-reducing sugar derivatives such as the alkyl glycosides and polyol glycosides.

Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

Phosphorous-containing derivatives such as tris(dipropylene) glycol phosphite and other phosphites are useful polyols.

The polyol or polyol mixture employed can have hydroxyl numbers which vary over a wide range. In general, the hydroxyl numbers of the polyols can range from about 20, and lower, to about 1000, and higher, preferably, from about 30 to about 800, and more preferably, from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = (56.1 \times 1000 \times f)/(m.w.)$$

where

OH = hydroxyl number of the polyol
$f$ = average functionality, that is average number of hydroxyl groups per molecule of polyol
m.w. = average molecular weight of the polyol.

The exact polyol employed depends upon the end-use of the urethane product. For example, when used to prepare foams, the molecular weight and the hydroxyl number are selected properly to result in flexible, semi-flexible, or rigid foams. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

The cellular polyurethanes can be produced, for example, by the one-shot technique wherein all of the reactants are reacted simultaneously. Also, the quasi-prepolymer technique can be used to produce the polyurethane foams. In this technique, the polyisocyanate is first reacted with a portion of the polyol to give a product having a high percentage of free —NCO groups, e.g., from 20 to 50 per cent, and the resulting isocyanato product is subsequently foamed by reaction with the remainder of the polyol and foaming agent.

The amount of polyisocyanate employed will vary slightly depending upon the nature of the polyurethane being prepared. In general the total —NCO equivalent to total active hydrogen equivalent should be such as to provide a ratio of 0.8 to 1.2 equivalents of —NCO per equivalent of active hydrogen, and preferably a ratio of about 1.0 to 1.1 equivalents of —NCO per reactive hydrogen. The foaming operation is preferably effected by the one-shot technique, although the quasi-prepolymer technique can also be employed if desired.

Foaming can be accomplished by employing a small amount of a polyurethane blowing agent such as water in the reaction mixture, for example, from about 0.5 to about 5 weight per cent of water, based upon total weight of the reaction mixture, or through the use of blowing agents which are vaporized by the exotherm of the reaction, or by a combination of the two methods. All of these methods are known in the art. Illustrative polyurethane blowing agents include the halogenated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoromethane, hexafluorocyclobutene, octafluorocyclobutane, and the like. The generally preferred method of foaming for producing flexible foams is the use of water or a combination of water plus a fluorocarbon blowing agent such as trichloromonofluoromethane. The quantity of blowing agent employed will vary with factors such as the density desired in the foamed product. In general, however, it may be stated that for 100 grams of reaction mixture containing an average NCO/OH ratio of about 1:1, about 0.005 to 0.3 mole of gas are used to provide densities ranging from 30 to 1 pound per cubic foot respectively. The exact amount of blowing agent used can be determined by routine laboratory experimentation.

Catalysts are ordinarily employed in the reaction mixture for accelerating the isocyanate-reactive hydrogen reaction. Such catalysts include a wide variety of compounds such as tertiary amines such as trimethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2,2,2]octane, and the like; the salts of organic carboxylic acids with a variety of metals such as alkali metals, alkaline earth metals, Al, Sn, Pb, Sb, Mn, Co, Ni, and Cu; some of the more important of such salts being, for instance, stannous octoate, stannous acetate, stannous oleate, lead octoate, metallic driers such as manganese and cobalt naphthenate, sodium acetate, potassium laurate, calcium hexanoate, and the like; the organometallic derivatives of tetravalent tin, trivalent and pentavelent As, Sb and Bi, and metal carbonyls of iron and cobalt such as the dialkyltin salts of carboxylic acids, for example, dibutyltin dilaurate, dibutyltin diacetate, dibutyltin maleate, dilauryltin diacetate, dioctyltin diacetate, and the like; the tertiary phosphines; the alkali metal and the alkaline earth metal hydroxides, alkoxides, and phenoxides; the acidic metal salts of strong acids; and the like.

The tertiary amines may be used as primary catalysts for accelerating the isocyanato-reactive hydrogen reaction, or as secondary catalysts in combination with the above-noted metal catalysts, in particular, the stannous salts of carboxylic acids or the organometallic tin derivatives. Metal catalysts, or combinations thereof, can also be used as the sole catalysts. The catalysts are employed in small amounts, for example, from about 0.001 weight per cent to about 5 weight per cent, based on weight of the reaction mixture.

It is also within the scope of the invention to employ small amounts, e.g., about 0.001 per cent to 5.0 per cent by weight, based on the total reaction mixture, of an emulsifying agent such as a polysiloxane-polyoxyalkylene block copolymer having from about 10 to 80 per cent by weight of siloxane polymer and from 90 to 20 per cent by weight of alkylene oxide polymer, such as the block copolymers described in U.S. Pat. Nos. 2,834,748 and 2,917,480. Another useful class of emulsifiers are the non-hydrolyzable polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. The non-hydrolyzable copolymers generally contain from 5 to 95 weight per cent, and preferably from 5 to 50 weight per cent, of polysiloxane polymer, with the remainder being polyoxyalkylene polymer. The non-hydrolyzable copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer.

In the following examples the flexible and rigid polyurethane foams are made from standard materials using ratios of ingredients as disclosed herein.

A standard flexible foam formulation is made from tolylene diisocyanate; a propylene oxide adduct of glycerol having an average hydroxyl number of 56.1, an average molecular weight of 3.0000, apparent specific gravity (20/20°C.) of 1.010, maximum acid number 0.05, pH (25°C., 10:6 isopropanol-water solution); a polypropylene glycol having an average molecular weight of 2.000, apparent specific gravity (20/20°C.) of 1.005, average hydroxyl number 56.1, maximum acid no. of 0.1, pH (25°C., 10:6 isopropanol-water); water; TMBDA (N,N,N',N'-tetramethyl-1,3-butanediamine); as a surfactant $(C_4H_9O(C_2H_4O)_{19}(C_3H_6O)_{14}[(CH_3)_2SiO]_{6.4})_3SiCH_3$ and stannous octoate as a catalyst.

A standard rigid foam formulation is made from AFPI, a condensation product of aniline and formaldehyde which is subsequently phosgenated to obtain osocyanate moieties along the polymer chain; a propylene oxide adduct of sorbitol having an apparent specific gravity (20/20°C.) of 1.094, an average hydroxyl number of 490, and an acid number of 0.1; a blowing agent comprising trichloromonofluoromethane; TMBDA as a catalyst and as a surfactant: $(CH_3)_3SiO[(CH_3)_2SiO]_{13}[CH_3O(C_2H_4O)_{16}C_3H_6SiCH_3O]_{5.5}Si(CH_3)_3$ Illustrative of the substrates upon which a coating or layer of interpolymer can be applied thereto include surfaces fabricated from, for example, nickel; copper; aluminum; brass; steel; bronze; cellulosic materials such as wood, paper, cardboard, and cotton cloth; regenerated cellulose; cellulose nitrate; thermosetting plastics such as phenolic resins, phenol-aldehyde resins, amino-aldehyde resins, urea-formaldehyde resins, epoxy resins, and polyester resins; silicone resins; ethylene; methacrylate resins; nylon; non-crosslinked rubbers such as natural rubber, GR-S rubber, butyl rubber, neoprene and nitrile rubbers; ceramic materials such as chinaware, pottery, porcelain, brick, terra cotta, sewerpipe, drin tile, fire brick, silica brick and refractory oxides; cements; stone; marble; granite; slate; sandstone; cinder block; and the like. Accordingly, as employed herein the term "substrate" includes any solid material to which the ethylene/alpha-beta olefinically unsaturated carboxylic acid interpolymers will adhere, including both polar materials and non-polar materials. The substrate may be in the form of a planar sheet or may be shaped as a rod, cylinder, bottle, filament, fiber, yarn, rope, woven cloth, a non-woven fabric or composite, and the like.

Fillers inorganic and/or organic colorants may also be used in the interpolymer or polyurethane, all of which are known in the art.

EXAMPLE I

A random ethylene/acrylic acid interpolymer made by a batch method having a melt index of 290–340 and containing 81–80 weight per cent ethylene with the balance being randomly distributed acrylic acid is dissolved in 15–100 weight per cent aqueous solution of sodium hydroxide to make a 10 weight per cent aqueous solution of ethylene/acrylic acid interpolymer. A coating of ethylene/acrylic acid interpolymer is then electrodeposited on steel and aluminum using these metals as the anode immersed in the aforesaid aqueous solution. A current density of 0.626 amp. at 75 volts cm.$^{-2}$ for steel and 0.570 amp. cm.$^{-2}$ at 75 volts for aluminum for a period of 1 minute at 20°C. is used. This electrolytic coating method is sufficient to substantially prevent alkaline cations from being associated with the electrodeposited interpolymer. This is true even with higher concentrations of Na$^+$ cations in the interpolymer as when the carboxyl moieties in the polymer are completely reacted with the Na$^+$ ions. Both aluminum and steel panels are then dip-coated with a standard commercially available ambient moisture curable polyurethane coating (isocyanato-terminated prepolymer prepared from tolylene diisocyanate and a polyol).

The polyuretahane coatings are cured and the adhesion measured by a cross-hatch cellophane tape test where the adhesion of the coating is evaluated by cross-hatching a one square inch area of the coating surface with razor blade cuts ⅛ inch apart at right angles to one another, applying a strip of conventional cellophane type transparent adhesive tape firmly to the cross-hatched area, jerking the tape from this area, and observing what part if any, of the coating is removed by the tape. The adhesion is rated as "excellent" if no coating is removed; "good" if less than 25 per cent is removed; "fair" if 25–50 per cent is removed; and "poor" if more than 75 per cent is removed.

The results are tabulated in Table I below:

TABLE I

| Substrate Dimensions | Substrate | Cure for Polyurethane Coating on Interpolymer | Peel Strength of Polyurethane to Interpolymer |
|---|---|---|---|
| 2"×5"×11 mil | Steel | 10 min. at 22°C. 30 min. at 90°C. | Excellent |
| 2"×5"×11 mil | Steel | 30 min. at 175°C. | Excellent |
| 2"×7"×5 mil | Aluminum | 10 min. at 22°C. 30 min. at 90°C. | Poor |
| 2"×7"×5 mil | Aluminum | 30 min. at 175°C. | Excellent |

EXAMPLE 2

The method of Example 1 is repeated except that a 2 × 5 inch × 10 mil steel plate is coated with the interpolymer of Example 1.

A commercially available solid polyurethane about 1/16 inches thick is pressed onto several of the coated plates using a carver press at 20 lbs. in$^{-2}$ gauge at elevated temperatures and the peel strength measured by placing the steel plate in one jaw and the polyurethane in the other jaw of an Instron machine at a crosshead speed of 2 inches per minute at 20°C. The method is a modification of ASTM-D903-49.

The results are given in Table II below.

TABLE II

| Temp., °C. | Press Time, Sec. | Peel Strength lbs. per Lineal Inch |
|---|---|---|
| 200° | 36 | 2.1 |
| 210° | 84 | 6 |
| 235° | 93 | 8 |
| 210° * | 90 | 3 |

*Control: Polyurethane pressed to steel having no ethylene/acrylic acid interpolymer.

EXAMPLE 3

An aluminum plate is coated with uniform random interpolymer of ethylene and 20 per cent by weight acrylic acid having a melt index of N240-340 dissolved in an excess of aqueous NH$_4$OH so that the solution has approximately 100 per cent by weight of the interpolymer dissolved therein. The coating is dried at about 90°C. to volatilize any NH$^+_4$ ions via NH$_3$ gas leaving a film of interpolymer of ethylene and acrylic acid adhered to the aluminum containing about less than one weight per cent NH$^+_4$ ions. A rigid polyurethane foam is then formed in situ by reacting in contact with the aluminum plate. An excellent adhesion of the cellular polyurethane to the aluminum plate is botained through the interpolymer.

EXAMPLE 4

A preformed flexible polyurethane foam is bonded directly to an adhesive film of a uniform random interpolymer of ethylene and acrylic acid having 12.8 weight per cent acrylic acid and a melt index of 5.5. The foam and interpolymer are bonded at 180°C., 2 psi pressure, and a dwell time of 15 seconds. Substantially the same results are obtained as in Example 3.

EXAMPLE 5

An 8 mil film of a uniform random interpolymer of ethylene and 12.8 weight per cent acrylic acid having a melt index of 5.5 is bonded to an aluminum plate which is heated radiantly by means of a 220°C. hot plate held from ¼ to 5/16 inches from said interpolymer surface for 72 seconds. A flexible polyurethane foam having a density of 2. lbs. ft$^{-3}$ is then placed on the heated interpolymer and pressed at about ½ lb. in$^{-2}$ pressure hand pressure. The adhesion of the interpolymer to the polyurethane foam is excellent and could not be delaminated by hand.

EXAMPLE 6

The method of Example 5 is repeated using a uniform random interpolymer of ethylene and 15.1 per cent by weight of acrylic acid which has a melt index of 50. The interpolymer is directly applied to the substrate under heat and pressure as a preformed film. The polyurethane is lightly pressed to the heated interpolymer film by hand pressure using ½ lb. in.$^{-2}$ pressure. Substantially the same results are obtained as in Example 5.

EXAMPLE 7

The method of Example 6 is repeated with the exception, however, that opposite sides of the polyurethane foam are pressed to two aluminum panels to obtain a sandwich construction. The adhesion of the polyurethane to the interpolymer is excellent.

EXAMPLE 8

A film comprising a uniform random interpolymer of ethylene and 12.8 weight per cent acrylic acid having a melt index of 5.5 is laid on a metal backing in a press. A flexible polyurethane foam slab is then placed on top of this interpolymer and an asbestos board placed over the polyurethane slab. The press is closed at a pressure of about 5 lbs. in $^{-2}$ at 180°C. between 20-40 seconds and good adhesion between the layers comprising metal, interpolymer, and polyurethane is obtained.

EXAMPLE 9

The method of Example 8 is repeated substituting cotton fabric for the metal plate. Substantially the same results are obtained.

EXAMPLE 10

The method of Example 8 is repeated substituting paper for the metal plate. Substantially the same results are obtained.

EXAMPLE 11

An aluminum plate is coated with a 20 weight per cent solids ammonia solution of a uniform random ethylene/acrylic acid interpolymer dissolved in an excess of NH$_4$OH to give 100 per cent conversion interpolymer containing 20.7 weight per cent acrylic acid having a melt index of 330. The carboxyl groups of the interpolymer were completely reacted with the NH$_4$$^+$ ions.

The coated aluminum plate is heated to 195°C. for 2.5 minutes. The heated coated surface is then pressed against the polyurethane foam of Example 5. Excellent adhesion is obtained between the interpolymer and the polyurethane foam.

EXAMPLE 12

The inside faces of two aluminum walls adjacent to one another are coated with a film of a random uniform interpolymer of ethylene and about 10 weight per cent acrylic acid by laminating the interpolymer film thereto by means of heat and pressure. Standard polyurethane foam components comprising polyisocyanate, polyol, promoter, and catalyst are reacted between the coated walls and a polyurethane foam is generated in situ between the walls. The structure thus obtained has excellent structural, thermal, and sound insulating properties and is useful in the manufacture of refrigerators, truck bodies, and the like. Substantially the same results are obtained when the interpolymer contains ethylene and from about 1.5 to about 20 weight per cent acrylic acid.

What is claimed is:

1. A method for bonding polyurethane foam to a substrate which comprises:
   i. bonding a layer of interpolymer to said substrate;
   ii. said interpolymer comprising from about 45 to about 98.5 weight per cent of ethylene and from about 1.5 to about 50 weight per cent of an alpha,-beta-olefinically unsaturated carboxylic acid of 3 to 15 carbon atoms polymerized therein;
   iii. and thereafter reacting a foamable mixture comprising polyisocyanate, polyol, and blowing agent to produce cellular polyurethane, the reaction of said foamable mixture being effected in contact with said layer of interpolymer so that said cellular polyurethane becomes bonded to said substrate through said layer of interpolymer during the foaming reaction.

2. The method of claim 1 wherein said interpolymer contains from about 60 to about 82 weight per cent of ethylene polymerized therein.

3. The method of claim 1 wherein said interpolymer contains up to about 35 weight per cent of a component of the group consisting of the C$_1$—C$_{12}$ alkanol esters of acids of the group consisting of acrylic, methacrylic, itaconic, citraconic, crotonic, maleic, and fumaric acids; vinyl formate; vinyl acetate; vinyl propionate; vinyl butyrate; vinyl chloride; vinylidene chloride; acrylamide; N-vinylacrylamide, N-vinyl-acetamide; and N-methyl-N-vinylacetamide.

4. The method of claim 1 wherein said alpha, beta-olefinically unsaturated carboxylic acid is acrylic acid.

5. The method of claim 1 wherein said alpha,beta-olefinically unsaturated carboxylic acid is methacrylic acid.

6. The method of claim 1 wherein said substrate is of the group consisting of aluminum and steel.

7. A method for bonding polyurethane foam to a substrate which comprises:
   i. electrodepositing a coating of inter-polymer onto said substrate from an electrolytic solution of an interpolymer comprising from about 45 to about 98.5 per cent by weight of ethylene and from about 1.5 to about 50 per cent by weight of the salt of an alpha,beta-olefinically unsaturated carboxylic acid of 3 to 15 carbon atoms polymerized therein, said salt being formed by neutralizing carboxyl groups of said acid with an alkaline compound of the group consisting of Group IA metal hydroxide, Group IIA metal hydroxide, amines, ammonia, and ammonium hydroxide;
   ii. permitting said coating of interpolymer to dry;
   iii. and thereafter reacting a foamable mixture comprising polyisocyanate, polyol, and blowing agent to produce cellular polyurethane, the reaction of said foamable mixture being effected in contact with said coating of interpolymer so that said cellular polyurethane becomes bonded to said substrate through said coating of interpolymer during the foaming reaction.

8. The method of claim 7 wherein said alkaline compound is ammonium hydroxide.

* * * * *